(12) United States Patent
Oohashi et al.

(10) Patent No.: US 6,882,688 B1
(45) Date of Patent: Apr. 19, 2005

(54) DEBLOCKING FILTER ARITHMETIC APPARATUS AND DEBLOCKING FILTER ARITHMETIC METHOD

(75) Inventors: Masahiro Oohashi, Fukuoka (JP); Shunichi Kuromaru, Fukuoka (JP); Tsuyoshi Nakamura, Fukuoka (JP); Hiroki Ootsuki, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/857,779
(22) PCT Filed: Dec. 10, 1999
(86) PCT No.: PCT/JP99/06985
§ 371 (c)(1), (2), (4) Date: Jul. 26, 2001
(87) PCT Pub. No.: WO00/36844
PCT Pub. Date: Jun. 22, 2000

(30) Foreign Application Priority Data

Dec. 11, 1998 (JP) .......................................... 10/352832

(51) Int. Cl.[7] ................................................ H04N 7/18
(52) U.S. Cl. .............................. 375/240.24; 375/240.29
(58) Field of Search ........................... 375/240.2–240.27

(56) References Cited

U.S. PATENT DOCUMENTS 5,703,965 A * 12/1997 Fu et al. ..................... 382/232
6,226,323 B1 * 5/2001 Tan et al. .................... 375/233
6,377,628 B1 * 4/2002 Schultz et al. .......... 375/240.26
6,421,464 B1 * 7/2002 Tran et al. ................... 382/232
6,529,637 B1 * 3/2003 Cooper ....................... 382/267
6,546,480 B1 * 4/2003 Mandavilli et al. ......... 712/222

FOREIGN PATENT DOCUMENTS

| GB | 2 329 090 | 3/1999 |
| JP | 03046482 | 2/1991 |
| JP | 05110871 | 4/1993 |
| JP | 07107274 | 4/1995 |
| JP | 08079752 | 3/1996 |
| JP | 08181990 | 7/1996 |

OTHER PUBLICATIONS

ISO/IEC 14496–2:1999(E), pp 260–263.
Koichi Fukuda et al., "Adaptive Processing with Quadratic Programming and LPF for Reducing Blocking Artifacts in DCT Image Coding," Jan. 25, 1999, vol. J82–A No. 1, pp. 142–150 (partial translation).

* cited by examiner

Primary Examiner—Andy Rao
(74) Attorney, Agent, or Firm—Parkhurst & Wendel, L.L.P.

(57) ABSTRACT

A deblocking filter arithmetic apparatus and a deblocking filter arithmetic method employed for removing block noises generated at decoding image data which have been subjected to the encoding process. Successive pixel data are input to eight arithmetic blocks (101~108) every two data, a filtering processing arithmetic for removal of the block noises is carried out in parallel so as to conclude the filtering processing arithmetic in a unit of the combination of two arithmetic blocks in an order successively, thereby the pixel data obtained by performing the filtering processing are output by a pipeline system in a unit of the combination of the arithmetic blocks from an output selection circuit (8).

3 Claims, 6 Drawing Sheets

| CNT | inputted register | stored data | m=1 | m=2 | m=3 | m=4 |
|---|---|---|---|---|---|---|
| 0 | AU | g(1) | ● | ● | ● | ● |
|   | AL | g(2) | ● | ● | ● | ● |
|   | CRU | max_pad | | | | |
|   | CRL | min_pad | M=AU<<2 +AL<<1+8 | N=AU<<1 +AL<<2+8 | P=AU<<1 +AL<<1+8 | Q=AU+AL<<1 +8 |
| 1 | AU | g(3) | ● | ● | ● | ● |
|   | AL | g(4) | ● | ● | ● | ● |
|   | CRU | max_pad | | | | |
|   | CRL | min_pad | M=AU<<1 +AL+M | N=AU<<1 +AL<<1+N | P=AU<<2 +AL<<1+P | Q=AU<<1 +AL<<2+Q |
| 2 | AU | g(5) | ● | ● | ● | ● |
|   | AL | g(6) | | ● | ● | ● |
|   | CRU | max_pad | | | | |
|   | CRL | min_pad | ● | | | |
|   |    |    | M=AU+CRL<<1 +M | N=AU+AL +N | P=AU<<1 +AL+P | Q=AU<<1 +AL<<1+Q |
| 3 | AU | g(7) | | | ● | ● |
|   | AL | g(8) | | | | ● |
|   | CRU | max_pad | | | | |
|   | CRL | min_pad | ● | ● | ● | |
|   |    |    | M=CRL<<1 +CRL<<1+M | N=CRL<<1 +CRL<<1+N | P=AU+CRL +P | Q=AU+AL +Q |
| 4 | AU | g(7) | | | | |
|   | AL | g(8) | | | | |
|   | CRU | max_pad | | | | |
|   | CRL | min_pad | | | | ● |
|   |    |    | Don't Care | Don't Care | P=CRL+0 +P | Q=CRL+0 +Q |
| 5 | AU | g(7) | | | | |
|   | AL | g(8) | | | | |
|   | CRU | max_pad | | | | |
|   | CRL | min_pad | Don't Care | Don't Care | Don't Care | Don't Care |
| 6 | AU | g(9) | ● | ● | ● | ● |
|   | AL | g(10) | ● | ● | ● | ● |
|   | CRU | max_pad | | | | |
|   | CRL | min_pad | M=AU<<2 +AL<<1+8 | N=AU<<1 +AL<<2+8 | P=AU<<1 +AL<<1+8 | Q=AU+AL<<1 +8 |
| 7 | AU | g(11) | ● | ● | ● | ● |
|   | AL | g(12) | ● | ● | ● | ● |
|   | CRU | max_pad | | | | |
|   | CRL | min_pad | M=AU<<1 +AL+M | N=AU<<1 +AL<<1+N | P=AU<<2 +AL<<1+P | Q=AU<<1 +AL<<2+Q |
| 8 | AU | g(13) | ● | ● | ● | ● |
|   | AL | g(14) | ● | ● | ● | ● |
|   | CRU | max_pad | | | | |
|   | CRL | min_pad | | (Repeat the second cycle~ the seventh cycle after CNT=8) | | |
|   |    |    | 8 +min_pad +min_pad +min_pad<<1 +min_Pad<<1 +g(1)<<2 +g(2)<<1 +g(3)<<1 +g(4) +g(5) | 8 +min_pad +min_pad +min_pad<<1 +g(1)<<1 +g(2)<<2 +g(3)<<1 +g(4)<<1 +g(5) +g(6) | 8 +min_pad +min_pad +g(1)<<1 +g(2)<<1 +g(3)<<2 +g(4)<<1 +g(5)<<1 +g(6) +g(7) | 8 +min_pad +g(1) +g(2)<<1 +g(3)<<1 +g(4)<<2 +g(5)<<1 +g(6)<<1 +g(7) +g(8) |

| CNT | inputted register | stored data | m=5 | m=6 | m=7 | m=8 |
|---|---|---|---|---|---|---|
| 0 | AU | g(1) | • | | | |
| | AL | g(2) | • | • | | |
| | CRU | max_pad | | | | |
| | CRL | min_pad | | | | |
| | | | R=AU+AL+8 | S=AL+8 | T=0+0+T | U=0+0+U |
| 1 | AU | g(3) | • | • | • | |
| | AL | g(4) | • | • | • | • |
| | CRU | max_pad | | | | |
| | CRL | min_pad | | | | |
| | | | R=AU<<1+AL<<1+R | S=AU+AL<<1+S | T=AU+AL+8 | U=AL+0+8 |
| 2 | AU | g(5) | • | • | • | • |
| | AL | g(6) | • | • | • | • |
| | CRU | max_pad | | | | |
| | CRL | min_pad | | | | |
| | | | R=AU<<2+AL<<1+R | S=AU<<1+AL<<2+S | T=AU<<1+AL<<1+T | U=AU+AL<<1+U |
| 3 | AU | g(7) | • | • | • | • |
| | AL | g(8) | • | • | • | • |
| | CRU | max_pad | | • | | |
| | CRL | min_pad | | | | |
| | | | R=AU<<1+AL+R | S=AU<<1+AL<<1+S | T=AU<<2+AL<<1+T | U=AU<<1+AL<<2+U |
| 4 | AU | g(7) | | | | |
| | AL | g(8) | | | | |
| | CRU | max_pad | • | • | • | • |
| | CRL | min_pad | | | | |
| | | | R=CRU+0+R | S=CRU+CRU+S | T=CRU<<1+CRU+T | U=CRU<<1+CRU<<1+U |
| 5 | AU | g(7) | | | | |
| | AL | g(8) | | | | |
| | CRU | max_pad | | | • | • |
| | CRL | min_pad | | | | |
| | | | R=0+0+R | S=0+0+S | T=CRU+0+T | U=CRU+CRU+U |
| 6 | AU | g(9) | • | • | | |
| | AL | g(10) | • | • | | |
| | CRU | max_pad | | | | |
| | CRL | min_pad | | | | |
| | | | R=AU+AL+8 | S=AL+8 | T=0+0+T | U=0+0+U |
| 7 | AU | g(11) | • | • | • | |
| | AL | g(12) | • | • | • | • |
| | CRU | max_pad | | | | |
| | CRL | min_pad | | | | |
| | | | R=AU<<1+AL<<1+R | S=AU+AL<<1+S | T=AU+AL+8 | U=AL+0+8 |
| 8 | AU | g(13) | • | • | • | • |
| | AL | g(14) | • | • | • | • |
| | CRU | max_pad | | | | |
| | CRL | min_pad | | | | |
| | | | | (Repeat the second cycle ~ the seventh cycle after CNT=8) | | |
| | | | 8<br>+g(1)<br>+g(2)<br>+g(3)<<1<br>+g(4)<<1<br>+g(5)<<2<br>+g(6)<<1<br>+g(7)<<1<br>+g(8)<br>+max_pad | 8<br>+g(2)<br>+g(3)<br>+g(4)<<1<br>+g(5)<<1<br>+g(6)<<2<br>+g(7)<<1<br>+g(8)<<1<br>+max_pad<br>+max_pad | 8<br>+g(3)<br>+g(4)<br>+g(5)<<1<br>+g(6)<<1<br>+g(7)<<2<br>+g(8)<<1<br>+max_pad<<1<br>+max_pad<br>+max_pad | 8<br>+g(4)<br>+g(5)<br>+g(6)<<1<br>+g(7)<<1<br>+g(8)<<2<br>+max_pad<<1<br>+max_pad<<1<br>+max_pad<br>+max_pad |

Fig.6

| CNT | OUTD (output selection) ||||||||  output |
|---|---|---|---|---|---|---|---|---|---|
| | M | N | P | Q | R | S | T | U | |
| 0 | x | x | x | x | x | x | x | x | x |
| 1 | x | x | x | x | x | x | x | x | x |
| 2 | x | x | x | x | x | x | x | x | x |
| 3 | x | x | x | x | x | x | x | x | x |
| 4 | 1● | 2● | x | x | x | x | x | x | 1,2 |
| 5 | x | x | 3● | 4● | x | x | x | x | 3,4 |
| 6 | x | x | x | x | 5● | 6● | x | x | 5,6 |
| 7 | x | x | x | x | x | x | 7● | 8● | 7,8 |
| 8 | x | x | x | x | x | x | x | x | x |

(Repeat the second cycle ~ the seventh cycle after CNT=8)

US 6,882,688 B1

DEBLOCKING FILTER ARITHMETIC APPARATUS AND DEBLOCKING FILTER ARITHMETIC METHOD

TECHNICAL FIELD

The present invention relates to a deblocking filter arithmetic apparatus and a deblocking filter arithmetic method for removing block noises, which is one of the post processings of reconstructed pixel data employed in an image signal processing or the like, and relates to a deblockinq filter arithmetic apparatus and a deblocking filter arithmetic method which carry out an arithmetic in a DC offset mode that is a deblocking filter arithmetic which is standardized by MPEG4.

BACKGROUND OF INVENTION

As a method of encoding or decoding moving picture data by employing a band compression technique, there are MPEG systems (Moving Picture Coding Experts Group) discussed and standardized by ISO-IEC/JTCI/SC2/wGll. In these MPEG systems, it is fundamental to utilize the intra-picture correlation, to divide a picture into blocks each comprising plural pixels, perform a discrete cosine conversion as an orthogonal conversion systems and a processing of quantization and Huffman coding to data of each block, thereby realizing the compression of image data. The pixels which are obtained by performing those processings can not be reproduced the original pixels prudently even if the inverse processing is performed, as a result, the pixels existing at the boundary parts of adjacent two blocks have different values. Thereby, block noises are generated.

Figure 4:
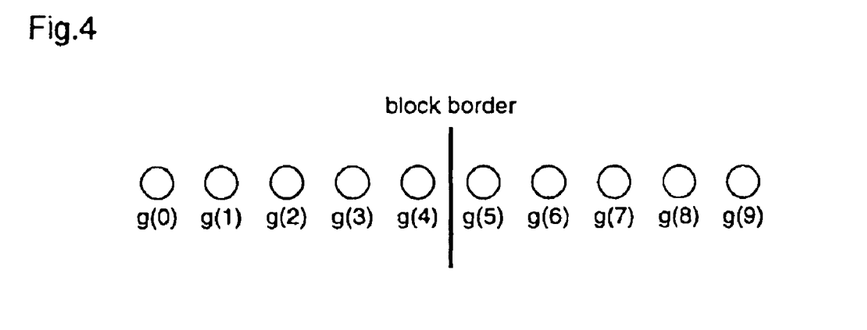
FIG. 4 is a diagram illustrating an arrangement of pixel data with a block boundary at the center, for explaining the operation of the conventional deblock filter arithmetic apparatus.

In MPEG4, a deblocking filter has been standardized as a countermeasure against this problem. This filter is constituted to have two kinds of operation modes, in a case where the one dimensional window having the block boundary at its center is provided as shown in FIG. 4. In FIG. 4, $g(n)$ (n is an integer from 0 to 9) denotes pixel data of ten pixels next to one other with the block boundary at the center. This filter performs the adaptive switching of those operation modes according to the activity of the block boundary neighboring pixels. The following evaluation function is employed for the switching of the operation mode.

$f = \phi\{g(0)-g(1)\} + \phi\{g(1) \ g(2)\}$
$+\phi\{g(2)-g(3)\} + \phi\{g(3)-g(4)\}$
$|\phi\{g(4)-g(5)\} + \phi\{g(5)-g(6)\}$
$+\phi\{g(6)-g(7)\} + \phi\{g(7)-g(8)\}$
$\phi\{(g(8)-g(9)\};$
here, i $f(|x|<=Th1(=2)\}$
  $\phi(x)=1;$
  else
  $\phi(x)=0;$ Th denotes a threshold value. The operation mode is switched as follows employing the evaluation function.
if (f>−Th2 (=6))
  DC offset mode;
else
  default mode;

The DC offset mode shown here is an operation mode in case where the changing of the pixel data existing at the block boundary is calm, and the default mode is an operation mode in case where the changing of the pixel data existing at the block border is drastic. With respect to the DC offset mode, the filter shown in the following is defined.

coef(1)=1:
coef(2)=1:
coef(3)=2:
coef(4)=2:
coef(5)=4:
coef(6)=2:
coef(7)=2:
coef(8)=1:
coef(9)=1:
Then, the following filtering processing is performed to obtain the processed pixel $g'(m)$ (m=1, 2, 3, 4, 5, 6, 7, 8) MAX=max $(g(1), g(2), g(3), g(4), g(5), g(6), g(7), g(8))$:
MIN=min $(g(1), g(2), g(3), g(4), g(5), g(6), g(7), g(8))$:
if($|$MAX−MIN$|$<2*QP)

Figure 3:
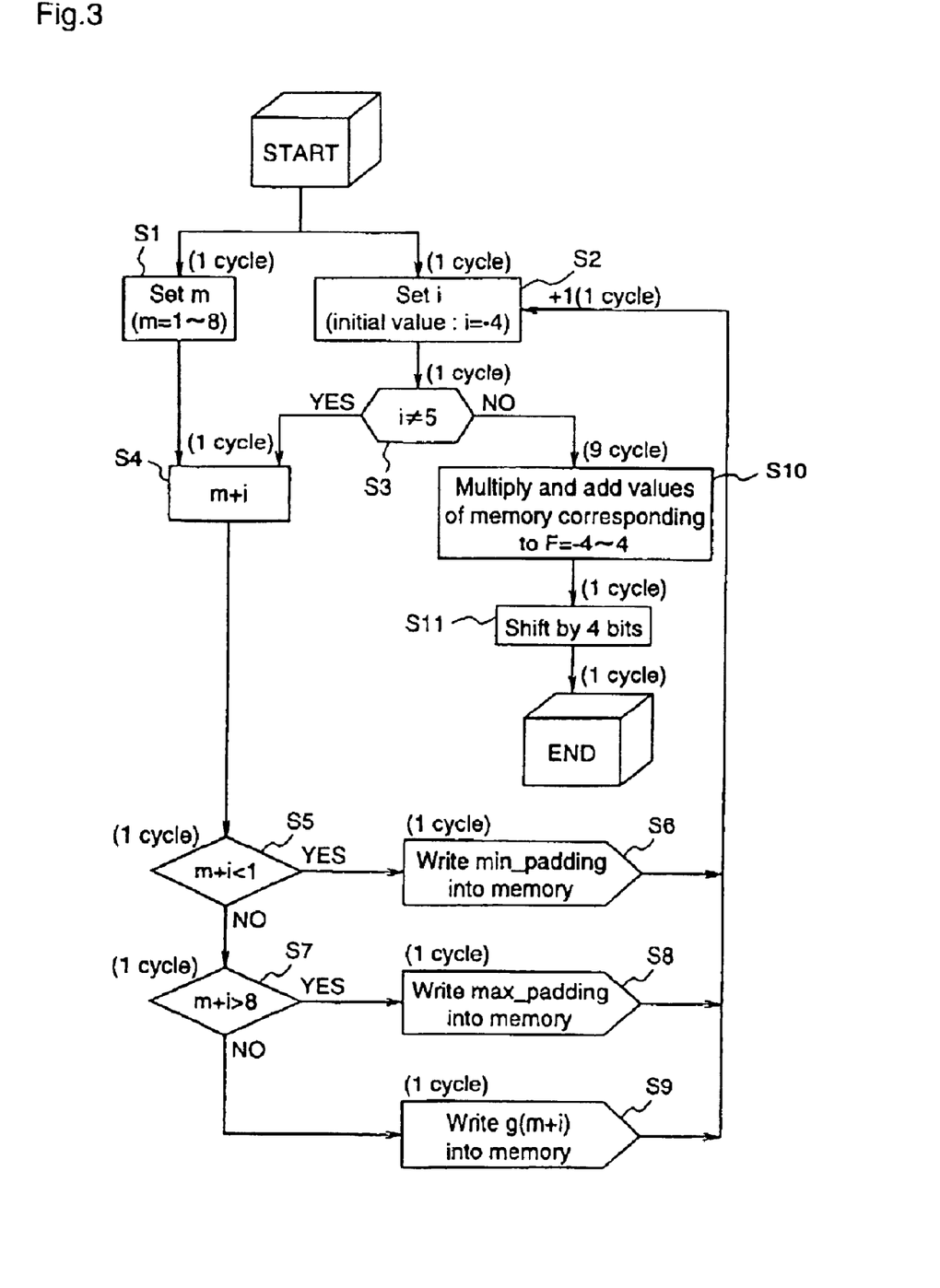
FIG. 3 is a flowchart illustrating an operation of a conventional deblocking filter arithmetic apparatus.

```
if ( | MAX - MIN | < 2 * Q P )
{
    min_padding = | g ( 0 ) - g ( 1 ) | < Q P ? g ( 0 ) : g ( 1 ) ;
    max_padding = | g ( 8 ) - g ( 9 ) | < Q P ? g ( 9 ) : g ( 8 ) ;
    g' ( m ) = 0 ;
    f o r ( i = - 4 ; i < 5 ; i ++ )
        g' ( m ) += coef( i + 4 ) *
            ( m + i < 1 ? min_padding :
            ( m + i > 8 ? max_padding : g ( m + i ) ) ) ;
        g' ( m ) = n i n t ( g' ( m ) / 1 6 ) ;
}
e l s e
    g' ( m ) = g ( m ) ;
``` else
  $g'(m)=g(m);$
Here, QP denotes a quantization parameter of a macro block to which a pixel value of $g(5)$ belongs. Further, min_padding and max_padding are, as defined in the above-described equations, values which are obtained respectively from the first pixel data $g(1)$ and the eighth pixel data $g(8)$, and the pixel data $g(0)$ and the pixel data $g(9)$, which are adjacent at outside the pixel data $g(1)$ and the pixel data $g(8)$, respectively. This filtering is performed to all horizontal edges, and thereafter, performed to all vertical edges. In this filtering processing, when
for(i=−4; i<5; i++)
  g'(m)+−coef (i+4)*
    (m+1<1? min_padding:
    (m+i>8? max_padding: g(m)1)))
g'(m)=n int (g'(m)/16);
are carried out by software in a general purpose arithmetic device included in the processor, the flow as shown in FIG. 3 is obtained.

Hereinafter, the flow shown in FIG. 3 will be described. At first, by a start instruction, the value m out of eight pixels g(m), to which the arithmetic processing is to be carried out, is set (step S1). Next, the value i is set (step S2). As the initial value for i, i=−4 is set. Subsequently, whether i is 5 or not is detected (step S3), and when i is not 5, m and i are added (step S4). Then, when m+i is smaller than 1 in step S5, min_padding data is written into the memory and 1 is added to i (step S6). Further, when m+i is larger than or equal to 1, m+i and 8 are compared in step S7, and when m+i is larger than 8, max_padding data is written into the memory and 1 is added to i (step S8). When m+i is smaller than or equal to 8, g(m+i) data is written into memory and 1 is added to i (step S9). For each value of m, these operations are repeated nine times in total, i.e., while the value i changes from −4 to 4, and when the value of i is 5, multiplication and addition are performed to nine data which have been written into the memory until then (step S10), and the result is shifted by 4 bits in step S11, thereby a result obtained by performing the filtering processing, i.e., the pixel data obtained by performing the filtering processing are output.

However, in the filtering processing performed by the conventional general purpose arithmetic device, a result is output by repeating by nine times in total for i from −4 to 4, for each value of m. In order to output this one result, 67 cycles are required at the maximum. In addition, there are 8 values from 1 to 8 for the value of m, and therefore, 536 cycles that is obtained by multiplying 67 cycles by 8 are required, thereby resulting in an increase in the arithmetic cycle number, which further results in the processing.

The present invention is made to solve the above-described problems, and has for its object to provide a deblocking filter arithmetic apparatus having a less arithmetic cycle number.

DISCLOSURE OF INVENTION

A deblocking filter arithmetic apparatus according to the present invention includes a first to eighth arithmetic blocks which receive, ds inputs, simultaneously every two adjacent data among a first to eighth pixel data, carry out one of the cycles of the processing arithmetic constituting the filtering processing corresponding to the first to eighth pixel data and performed for removal of block noises, every time when two of the pixel data are input, and output the respective pixel data having been subjected to the filtering processing, being provided in parallel corresponding to the first to the eighth pixel data and to which two of the pixel data are input simultaneously, an output selection circuit which selects one from the outputs from the first to the eighth arithmetic blocks to output the same, and a control circuit which controls the processing arithmetic of each arithmetic block, in accordance with the cycles of the processing arithmetic, so that the cycles of the processing arithmetic performed in each combination, among a combination of the first and the second arithmetic block, a combination of the third and the fourth arithmetic block, a combination of the fifth and the sixth arithmetic block, and a combination of the seventh and the eighth arithmetic block, respectively constituted by above-described arithmetic blocks up to the conclusion of the respective filtering processing should be the same and, further that the filtering processing of each combination should be concluded in an order successively among the respective combinations, and which controls the output selection circuit so as to select the output from the arithmetic blocks in a unit of the combination of the arithmetic blocks and to perform pipeline output. Therefore, the processing cycles of arithmetic by each arithmetic block can be reduced and the arithmetic results of each combination of the arithmetic blocks can be output by a pipeline output, whereby it is possible to result in reductions in cycles of the arithmetic processing.

According to the present invention, there is provided a deblocking filter arithmetic apparatus wherein, the arithmetic block comprises a first selection circuit which selects, according to the cycle of the processing arithmetic, any one among one of two pixel data input simultaneously, two values obtained respectively from the first pixel data and the eighth pixel data, and pixel data which are adjacent at outside the first pixel data and the eighth pixel data, and value 0, a second selection circuit which selects, according to the cycle of the processing arithmetic, any one among the other of the two pixel data input simultaneously, two values obtained respectively from the first pixel data and the eighth pixel data, and pixel data which are adjacent at outside the first pixel data and the eighth pixel data, and value 0, a third selection circuit which selects an arithmetic result for the accumulation or value 8, a first shifter which receives, as input, the output of the first selection circuit, a second shifter which receives, as input, the output of the second selection circuit, an adder which adds together the output of the first shifter, the output of the second shifter and the output of the third selection circuit, a register which receives, as input, the output of the adder and outputs the same as an arithmetic result for the accumulation to the third selection circuit, and a third shifter which receives, as input, the output of the register and outputs the same as an arithmetic result to the output selection circuit. Thereby, it is possible to result in reductions in cycles of the arithmetic processing.

According to the present invention, there is provided a deblocking filter arithmetic method comprising: a step for receiving, as inputs, simultaneously every two data among a first to an eighth successive pixel data and carrying out in parallel the processing arithmetic constituting the filtering processing corresponding to the first to the eighth pixel data and performed for removal of block noises, so that the cycles of the processing arithmetic performed in each combination, among a combination of the first and the second arithmetic block, a combination of the third and the fourth arithmetic block, a combination of the fifth and the sixth arithmetic block, and a combination of the seventh and the eighth arithmetic block, respectively constituted by above-described arithmetic blocks up to the conclusion of the respective filtering processing should be the same and, further that the filtering processing of respective combinations should be concluded in an order successively, and a step for performing a pipeline output of pixel data which are obtained by the above-described step with having been subjected to the filtering processing, for the respective combinations of the pixel data in an order successively. Therefore, the processing cycles of arithmetic by each arithmetic block can be reduced and the arithmetic results of each combination of the arithmetic blocks can be output by a pipeline output, whereby it is possible to result in reductions in cycles of the arithmetic processing.

BRIEF DESCRIPTION OF DRAWINGS

FIG. 2 is a diagram for explaining an operation of the arithmetic blocks corresponding to m=1~4 in the deblocking filter arithmetic apparatus according to the present invention.

BEST MODE TO EXECUTE THE INVENTION

Figure 1:
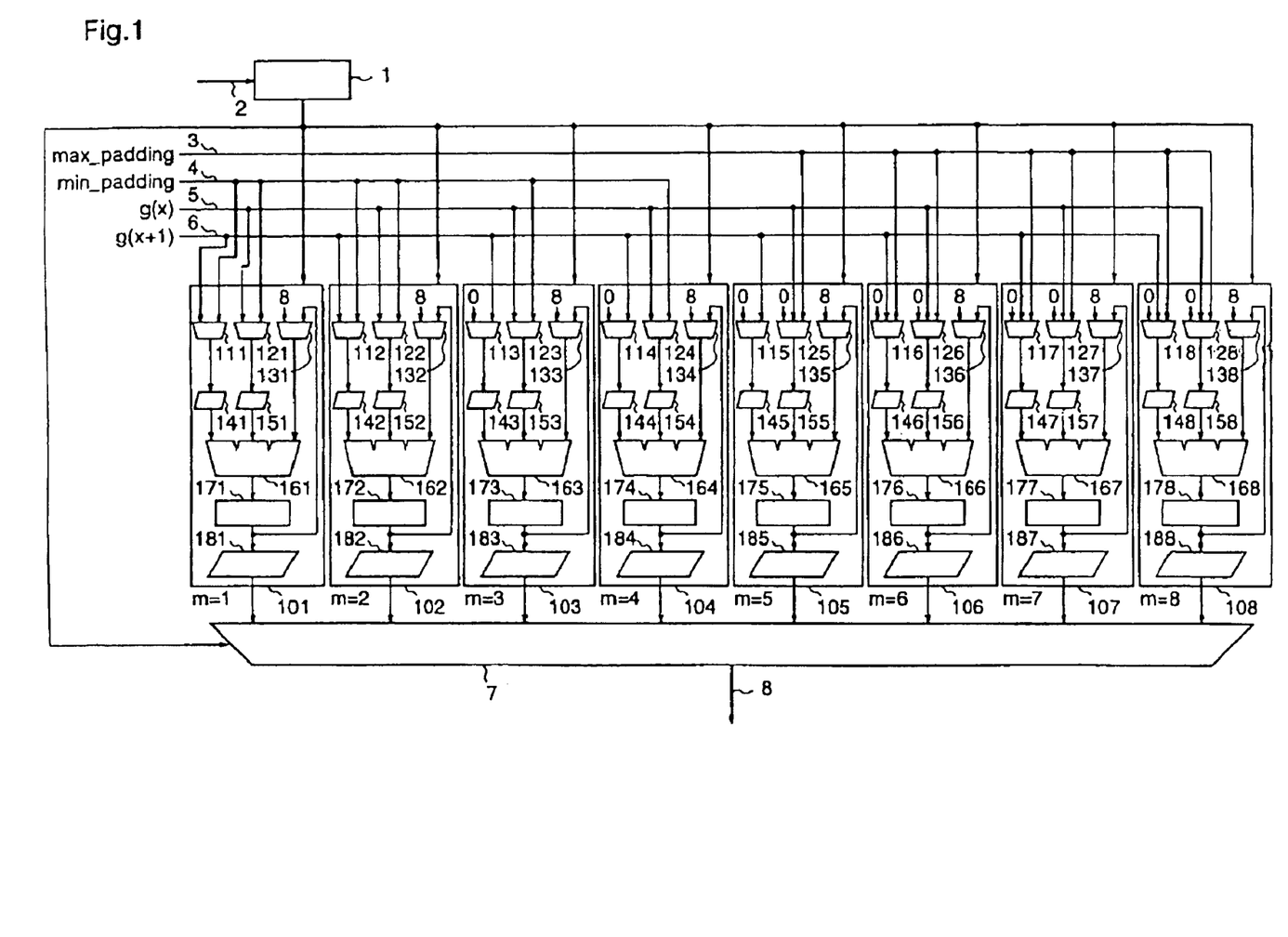
FIG. 1 is a block diagram of a deblocking filter arithmetic apparatus according to the present invention.

FIG. 1 is a block diagram illustrating the construction of a deblocking filter arithmetic apparatus according to an embodiment of the present invention. The deblocking filter arithmetic apparatus according to this embodiment is one that performs the following arithmetic, which is a part of the deblocking filter arithmetic:

```
for (i=-4; i<5: i++)
  g'(m)+=coef(i+4)*
    (m+1<1? min padding:
    (m+i>8? max_padding: g(m|1)))
```

$$g'(m)=nint(g'(m)/16): \qquad \text{equation(1)}$$

In this figure, a control circuit 1 performs counting of the processing cycles from 0 to 7 and outputs the count value to the first to eighth arithmetic blocks 101~108 corresponding to a first to an eighth pixels m (m is an integer from 1 to 8) as targets of the filtering in processing, and to an output selecting circuit 7 which selects one from the outputs from the first to eighth arithmetic blocks 101~108. The arithmetic block 101 comprise a first and second selection circuit 111 and 121, which receive as inputs at least two out of max_padding 3 and min_padding 4, which are produced outside beforehand and input, g(x) 5 and g(x+1) 6, which are actual 8 bits data, and data "0", a third selection circuit 131 which receives, as inputs, data "8" and the output of a register 171, which register is described later, a first and second shifter 141 and 151 which shift the selection results by the first and the second selection circuit 111 and 121 respectively, an adder 161 which adds the outputs of the first and the second shifter 141 and 151 to the output from the selection circuit 131, a register 171 to which the output from the adder 161 is input, and a third shifter 181 which receives, as inputs, the output of the register 171 and shifts it to output the result to the output selection circuit 7. The g(x) 5 and the g(x+1) 6 are input through the 16 bits bus. The max_padding 3 and the min_padding 4 are, as shown in the equation at the background of art, values obtained respectively from the first pixel data g(1) and the eighth pixel data g(8) among the first to eighth pixel data g(m) as targets of the filtering processing and the pixel data g(0) and the pixel data g(9) which are adjacent at outside the first pixel data g(1) and the eighth pixel data g(8) respectively. The arithmetic blocks 102~108 have the same construction as that of the arithmetic block 101, and they comprise respectively the first selection circuits 112~118, the second selection circuits 122~128, the third selection circuits 132~138, the first shifters 142~148, the second shifters 152~158, the adders 162~168, the registers 172~178 and the third shifters 182~188. The selection circuit 7 selects one from the outputs from the first to the eighth arithmetic blocks 101~108 to output one as output 8.

Figure 5:
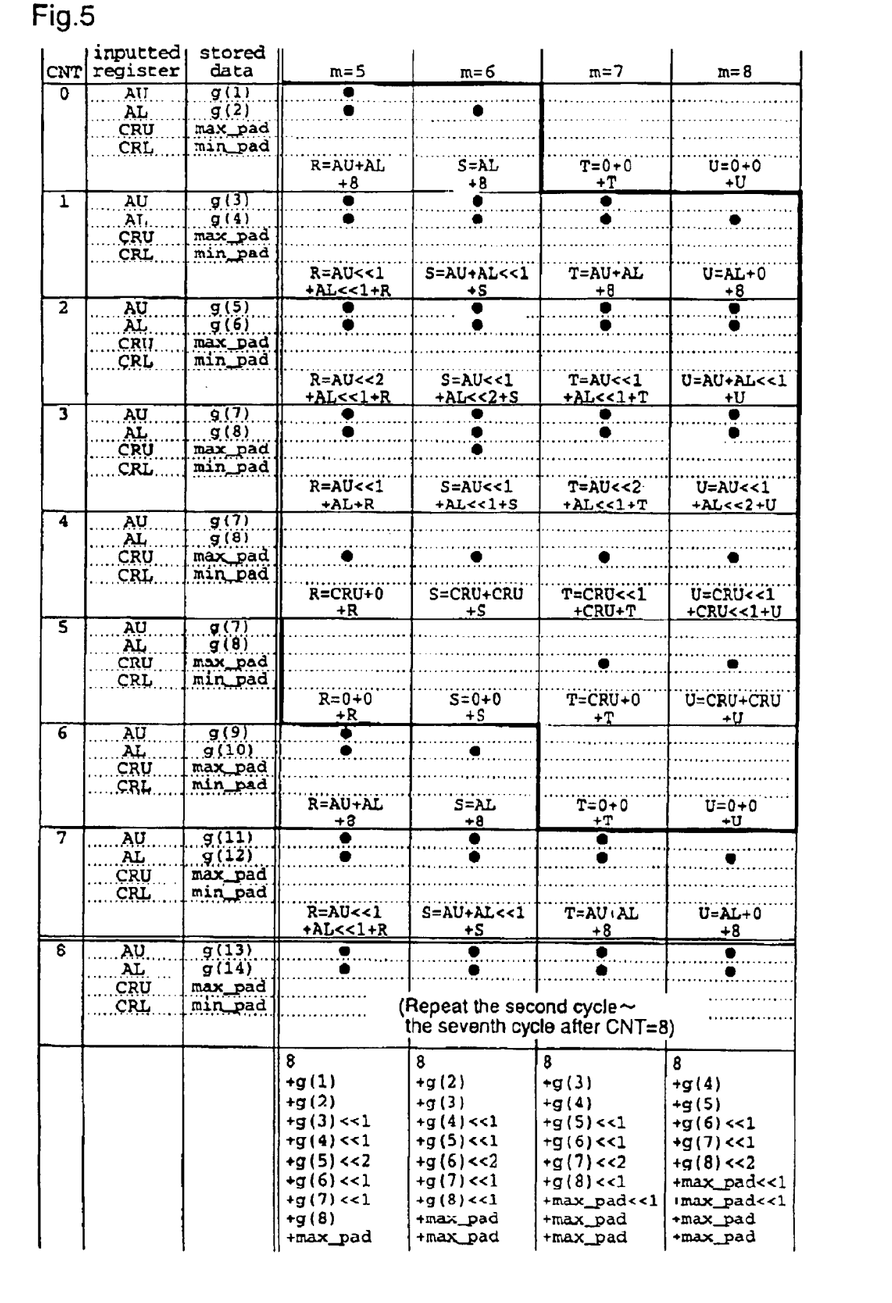
FIG. 5 is a diagram for explaining an operation of arithmetic blocks corresponding to m=5~8 in the deblocking filter arithmetic apparatus according to the present invention.
Figure 6:
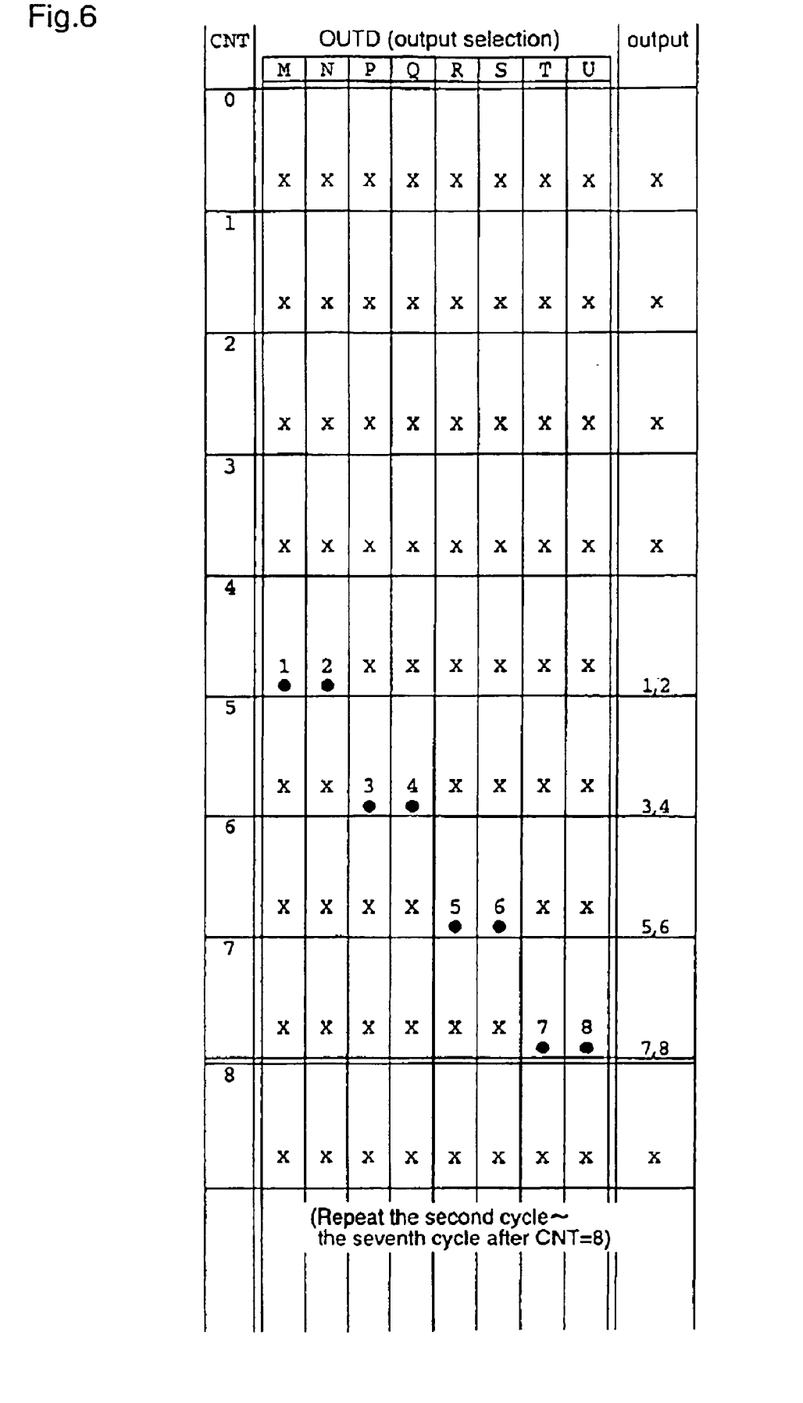
FIG. 6 is a diagram for explaining an output operation of the deblocking filter arithmetic apparatus according to the present invention.

FIG. 2, FIG. 5 and FIG. 6 are diagrams for explaining the operation of the deblocking filter arithmetic apparatus according to the embodiment of the present invention. More particularly, FIG. 2 shows the relationship between the arithmetic processing results of the arithmetic blocks 101~104 and the count value of the control circuit 1, FIG. 5 shows the relationship between the arithmetic processing results of the arithmetic blocks 105~108 and the count value of the control circuit 1, and FIG. 6 shows the relationship between the outputs to the output selection circuit 7 from the respective arithmetic blocks 101~108 and the count value. In these figures, m=1~8 correspond respectively to the arithmetic blocks 101~108 and M~U present. The arithmetic results of the arithmetic blocks 101~108. Further, black circles represent that g(x)5, g(x+1) 6, max_padding 3 and min_padding 4, which are input data respectively, are input. AU presents g(x) 5, AL presents g(x+1) 6, CRL presents min_padding 4, and CRU presents max_padding 3, respectively. A reference "<<" presents a bit shift.

A description is given of an operation of the deblocking filter arithmetic apparatus thus constituted with reference to FIG. 1, FIG. 2, FIG. 5 and FIG. 6.

The control circuit 1 shown in FIG. 1 performs counting up from 0 to 7 by a start signal 2 and repeats counting of 2 to 7 thereafter, and as shown in FIG. 2 and FIG. 5, it makes the pixel signals g(1) and g(2) input when the value of the counter value CNT is 0, the pixel signals g(3) and g(4) input when the value of CNT is 1, the pixel signals g(5) and g(6) input when the value of CNT is 2, the pixel signals g(7) and g(8) input when the value of CNT is 3, the pixel data g(7) and g(8) input when the value of CNT is 4, the pixel data g(7) and g(8) input when the value of CNT is 5, the pixel signals g(9) and g(10) input when the value of CNT is 6, and the pixel signals g(11) and g(12) input when the value of CNT is 7, respectively successively.

In the arithmetic block 101, as shown in FIG. 2, when the value of CNT is 0, g(2) and g(1) are selected by the first and the second selection circuit 111 and 121 respectively, "A" is selected by the third selection circuit 131, and the input data is shifted by 2 bits by the second shifter 151 and by 1 bit by the first shifter 141, the output of the first shifter 141, the output of the second shifter 151 and the output of the third selection circuit 131 are added together by the adder 161 to be stored in the register 171. The data M which is obtained as an arithmetic result of this processing cycle is M=AU<<2+AL<<1+8, as shown in FIG. 2. Next, when the value of CNT results in 1, g(4) and g(3) are selected by the first and the second selection circuit 111 and 121 respectively, and M, which is the arithmetic result when the value of CNT is 0, and is input from the register 171 to the third selection circuit 131, is selected by the third selection circuit 131, and the input data is shifted by 1 bit by the second shifter 151 and not shifted by the first shifter 141, the output of the first shifter 141, the output of the second shifter 151 and the output of the third selection circuit 131 are ladded together by the adder 161 to be stored in the register 171. The data M which is obtained as an arithmetic result of this processing cycle is M=AU<<1+AL+M (M represents the arithmetic result when the value of CNT is 0), as shown in FIG. 2.

Subsequently, when the value of CNT results in 2, min_padding and g(5) are selected by the first and second selection circuit 111 and 121 respectively, and M, which is the arithmetic result when the value of CNT is 1 and is input from the register 171 to the third selection circuit 131, is selected by the third selection circuit 131, and the input data is not shifted by the second shifter 151 and is shifted by 1 bit by the first shifter 141, the output of the first shifter 141, the output of the second shifter 151 and the output of the third selection circuit 131 are added together by the adder 161 to be stored in the register 171. The data M which is obtained as an arithmetic result of this processing cycle is M=AU+CRL<<1+M (M represents the arithmetic result when the value of CNT is 1), as shown in FIG. 2.

Subsequently, when the value of CNT results in 3, min_padding and min_padding are selected by the first and the second selection circuit 111 and 121, and M, which is the arithmetic result when the value of CNT is 2 and is input from the register 171 to the third selection circuit 131, is selected by the third selection circuit 1131, and the input data is shifted by 1 bit by the second shifter 151 and is shifted by 1 bit by the first shifter 141, the output of the first shifter 141, the output of the second shifter 151 and the output of the third selection circuit 131 are added together by the adder 161 to be stored in the register 171. The data M which is obtained as the arithmetic results of this processing cycle is M=CRL<<1+CRL<<1+M (M represents the arithmetic result when the value of CNT is 2), as shown in FIG. 2.

In this way, by repeating the arithmetic as shown in FIG. 2 until the value of CNT results in 3, 8+min_padding+min_padding<<1+min_padding<<1+min_padding <<1+g(1)<<2+g(2)<<1+g(3)<<1+g(4)+g(5), which is the final result of the arithmetic of 4 cycles in total of the arithmetic block 101, is shifted by 4 bits in the right direction by the third shifter 181 and is output.

The arithmetic block 101, thereafter, repeats the same processing as that described above from the timing when the counter has counted two processing cycles.

Hereinafter, the operation as shown in FIG. 2 and FIG. 5 is carried out on the basis of the count value by the arithmetic blocks 102~108 which have the same construction as that of the arithmetic block 101 also for m=2~8.

The operation of the respective arithmetic blocks 101~108 will be described in detail.

Initially, in the arithmetic block 101 corresponding to m=1, the value of the above-described equation (1) when the value of i is changed from −4 to 4 results in 1×min_padding when i=−4, 1×min_padding when i=−3, 2×min_padding when i=−2, 2×min_padding when i=−1. 4×g(1) when i=0, 2×g(2) when i=1, 2×g(3) when i=2, 1×g(4) when i=3, 1×g(5) when i=4.

Among them, the cases where i=−4 and i=−3 are collected to be represented by 2×min_padding, and is added to g(5) when i=4. This corresponds to AU+CRL<<1, which is the result when CNT=2 shown in FIG. 2. The cases where is =−2 and is =−1 are collected to be represented by 2×min_padding+2×min_padding, i.c., by CNT=3 and CRL<<1+CRL<<1 shown in FIG. 2, and the cases where i=0 and i=1 are collected to be represented by 4×g(1)+2×g(2), i.e., can be represented by CNT=0 and AU<<2+AL<<1 shown in FIG. 2, and the cases where i=2 and i=3 are collected to be represented by 2×g(3)+1×g(4), i.e., by CNT=1 and AU<<1+AL shown in FIG. 2. Here, M in FIG. 2 represents the output of the register 171 and, further, +8 when CNT=0 is a value for rounding and when there is no rounding, 0 may be input. In this way, selectors 111, 121 and 131 and shifters 141 and 151 are controlled according to the value of CNT, the above-described arithmetic is carried out, and the shifter 181 is shifted when the value of CNT is 4, which is the last, thereby a result obtained by performing the filtering processing to the pixel of m=1 as an arithmetic result. In this way, as a result that the arithmetic as shown in FIG. 2 is performed at the arithmetic block 101, a result which is the same as that obtained by the original arithmetic can be obtained with less cycles than in a case where 9 cycles arithmetic are performed for m=1 is performed with changing i from −4 to 4.

Further, the values of the equation (1) when the value of i is changed from −4 to 4 in the arithmetic block 102 corresponding to m=2 results in as follows.

i =− 4
    g ( 2 ) += coef ( 0 ) × min_padding
    = 1 × CRL
i =− 3
    g ( 2 ) += coef ( 1 ) × min_padding
    = 1 × CRL
i =− 2
    g ( 2 ) += coef ( 2 ) × min_padding
    = 2 × CRL
i =− 1
    g ( 2 ) += coef ( 3 ) × g ( 1 )
    = 2 × AU
i = 0
    g ( 2 ) += coef ( 4 ) × g ( 2 )

-continued

= 4 × AL
i = 1
    g ( 2 ) += coef ( 5 ) × g ( 3 )
    = 2 × AU
i = 2
    g ( 2 ) += coef ( 6 ) × g ( 4 )
    = 2 × AL
i = 3
    g ( 2 ) += coef ( 7 ) × g ( 5 )
    = 1 × AU
i = 4
    g ( 2 |= coef ( 8 ) × g ( 6 )
    = 1 × AL Among them, when i=−1 and i=0 are collected, it results in 2×g(1)+4×g(2) azLd can be represented by AU<<1+AL<<2 in the cycle of CNT=0 in FIG. 2, when i=1 and i=2 are collected, it results in 2×g(3)+2×g(4) and can be represented by AU<<1+AL<<1 in the cycle of CNT=1 in FIG. 2, when i–3 and i=4 are collected, it results in 1×g(5)+1×g(6) and can be represented by AU+AL in the cycle of CNT=2 in FIG. 2, and when i=−2 and i=−3 and i=−4 are collected, it results in 2×min_padding+2×min_padding and can be represented by CRL<<1+CRL<<1 in the cycle of CNT=3 in FIG. 2.

Here N in FIG. 2 represents the output at the previous cycle of the register 172 and, further, +8 when CNT=0 is a value for rounding and when there is no rounding, 0 may be input.

In this way, the selectors 112, 122 and 132 and the shifters 142 and 152 are controlled according to the value of the CNT, and the arithmetic as shown in FIG. 2 is carried out in the arithmetic block 102, thereby a result which is the same as that obtained by the original arithmetic can be obtained with less cycles than in a case where 9 cycles arithmetic to are performed with changing i from −4 to 4 successively for m=2. In addition, it is possible to make the cycle number up to the conclusion of the arithmetic be the same as that of the arithmetic processing corresponding to the pixel data of m=1 by the arithmetic block 101 and, further make the cycle at which the arithmetic processing is concluded be the same as that of the arithmetic block 101.

Further, the value of the equation (1) when the value of i is changed from 4 to 4 in the arithmetic block 103 corresponding to m=3 results in as follows.

i =− 4
    g ( 3 ) += coef ( 0 ) × min_padding
    = 1 × CRL
i =− 3
    g ( 3 ) += coef ( 1 ) × min_padding
    = 1 × CRL
i =− 2
    g ( 3 ) += coef ( 2 ) × g ( 1 )
    = 2 × AU
i =− 1
    g ( 3 ) += coef ( 3 ) × g ( 2 )
    = 2 × AL
i = 0
    g ( 3 ) += coef ( 4 ) × g ( 3 )
    = 4 × AU
i = 1
    g ( 3 ) += coef ( 5 ) × g ( 4 )
    = 2 × AL
i = 2
    g ( 3 ) += coef ( 6 ) × g ( 5 )
    = 2 × AU
i = 3
    g ( 3 ) += coef ( 7 ) × g ( 6 )

```
            i = 4
                g ( 3 ) += coef ( 8 ) × g ( 7 )
                    = 1 × AU
```

Among them, when i=−2 and i=−1 are collected, it results in 2×g(1)+2×g(2) and can be represented by AU<<1+AL<<1 in the cycle of CNT=0 in FIG. 2, when i=0 and i=1 are collected, it results in 4×g(3)+2×g(4) and can be represented by AU<<2+AL<<1 in the cycle of CNT=1 in FIG. 2, when i=2 and i=3 are collected, it results in 2×g(5)+1×g(6) and can be represented by AU<<2+AL in the cycle of CNT=2 in FIG. 2, and when i=4 and i=−4 are collected, it results in 1×g(7)+1×min_padding and can be represented by AU+CRL in the cycle of CNT=3 in FIG. 2, and i=−3 is 1×min_padding and it can be represented by CRL in the cycle of CNT=4 in FIG. 2. Here, P in FIG. 2 represents the output at the previous cycle of the register 173 and, further, +8 when CNT=0 is a value for rounding and when there is no rounding, 0 maybe be input.

In this way, selectors 113, 123 and 133 and shifters 143 and 153 are controlled according to the value of the CNT, and the arithmetic as shown in FIG. 2 is carried out in the arithmetic block 103, thereby it is possible to obtain a result which is the same as that obtained by the original arithmetic with less cycles than in a case where 9 cycles arithmetic to are performed with changing i from −4 to 4 successively for m=3.

Further, the value of the equation (1) when the value of i is changed from −4 to 4 in the arithmetic block 104 corresponding to m=4, becomes as follows.

```
            i = − 4
                g ( 3 ) += coef ( 0 ) × min_padding
                    = 1 × CRL
            i = − 3
                g ( 3 ) += coef ( 1 ) × g ( 1 )
                    = 1 × AU
            i = − 2
                g ( 3 ) += coef ( 2 ) × g ( 2 )
                    = 2 × AL
            i = − 1
                g ( 3 ) += coef ( 3 ) × g ( 3 )
                    = 2 × AU
            i = 0
                g ( 3 ) += coef ( 4 ) × g ( 4 )
                    = 4 × AL
            i = 1
                g ( 3 ) += coef ( 5 ) × g ( 5 )
                    = 2 × AU
            i = 2
                g ( 3 ) += coef ( 6 ) × g ( 6 )
                    = 2 × AL
            i = 3
                g ( 3 ) += coef ( 7 ) × g ( 7 )
                    = 1 × AU
            i = 4
                g ( 3 ) += coef ( 8 ) × g ( 8 )
                    = 1 × AL
```

Among them, when i=−3 and i=−2 are collected, it results in 1×g(1)+2×g(2) and can be represented by AU+AL<<1 in the cycle of CNT=0 shown in FIG. 2, when i=−1 and i=0 are collected, it results in 2×g(3)+4×g(4) and can be represented by AU<<1+AL<<2 in the cycle of CNT=1 shown in FIG. 2, when i=1 and i=2 are collected, it results in 2×g(5)+2×g(6) and can be represented by AU<<1+AL<<1 in the cycle of CNT=2 shown in FIG. 2, and when i=3 and i=4 are collected, it results in 1×g(7)+1×g(8) and can be represented by AU+AL in the cycle of CNT=3 shown in FIG. 2, and i=−4 is 1×min_padding and it can be represented by CRL in the cycle of CNT=4 shown in FIG. 2. Here, Q in FIG. 2 represents the output at the previous cycle from the register 174 and, further, +8 when CNT=0 is a value for rounding, and when there is no rounding, 0 may be input.

In this way, the selectors 114, 124 and 134 and the shifters 144 and 154 are controlled according to the value of the CNT, and the arithmetic as shown in FIG. 2 is carried out in the arithmetic block 104, thereby it is possible to obtain a result which is the same as that obtained by the original arithmetic, with less cycles than in a case where 9 cycles arithmetic are performed with changing i from −4 to 4 successively for m=4. In addition, it is possible to make the cycle number up to concluding the arithmetic be the same as that of the arithmetic processing corresponding to the pixel data of m=3 performed by the arithmetic block 103 and, further it is possible to make the cycle at which the arithmetic processing is concluded be the same as that by the arithmetic block 103.

Further, the values of the equation (1) when the value of i is changed from −4 to 4 in the arithmetic block 105 corresponding to m=5 become as follows.

```
            i = − 4
                g ( 3 ) += coef ( 0 ) × g ( 1 )
                    = 1 × AU
            i = − 3
                g ( 3 ) += coef ( 1 ) × g ( 2 )
                    = 1 × AL
            i = − 2
                g ( 3 ) += coef ( 2 ) × g ( 3 )
                    = 2 × AU
            i = − 1
                g ( 3 ) += coef ( 3 ) × g ( 4 )
                    = 2 × AL
            i = 0
                g ( 3 ) += coef ( 4 ) × g ( 5 )
                    = 4 × AU
            i = 1
                g ( 3 ) += coef ( 5 ) × g ( 6 )
                    = 2 × AL
            i = 2
                g ( 3 ) += coef ( 6 ) × g ( 7 )
                    = 2 × AU
            i = 3
                g ( 3 ) += coef ( 7 ) × g ( 8 )
                    = 1 × AL
            i = 4
                g ( 3 ) += coef ( 8 ) × max_padding
                    = 1 × CRU
```

Among them, when i=−4 and i=−3 are collected, it results in 1×g(1)+1×g(2) and can be represented by AU+AL in the cycle of CNT=0 shown in FIG. 5, when i—2 and i=−1 are collected, it results in 2×g(3)+2×g(4) and can be represented by AU<<1+AL<<1 in the cycle of CNT=1 shown in FIG. 5, when i=0 and i=1 are collected, it results in 4×g(5)+2×g(6) and can be represented by AU<<2+AL<<1 in the cycle of CNT-2 shown in FIG. 5, and when i=2 and i=3 are collected, it results in 2×g(7)+1×g(8) and can be represented by AU<<1+AL in the cycle or CNT=3 shown in FIG. 5, and i=4 is 1×max_padding and it can be represented by CRU in the cycle of CNT=4 shown in FIG. 5. Here, P in FIG. 5 represents the output at the previous cycle from the register 175 and, further, +8 when CNT=0 is a value for rounding, and when there is the rounding, 0 may be input.

In this way, the selectors 11, 125 and 135 and the shifters 145 and 155 are controlled according to the value of the CNT, and the arithmetic as shown in FIG. 5 is carried out in the arithmetic block 105, thereby it is possible to obtain a result which is the same as that obtained by the original arithmetic with less cycles than in a case where 9 cycles arithmetic are performed with changing the value i from −4 to 4 successively for m=5.

Further, the value of the equation (1) when the value of i is changed from −4 to 4 in the arithmetic block 106 corresponding to m=6 becomes as follows.

```
i = −4
    g(3) += coef(0) × g(2)
         = 1 × AL
i = −3
    g(3) += coef(1) × g(3)
         = 1 × AU
i = −2
    g(3) += coef(2) × g(4)
         = 2 × AL
i = −1
    g(3) += coef(3) × g(5)
         = 2 × AU
i = 0
    g(3) += coef(4) × g(6)
         = 4 × AL
i = 1
    g(3) += coef(5) × g(7)
         = 2 × AU
i = 2
    g(3) += coef(6) × g(6)
         = 2 × AL
i = 3
    g(3) += coef(7) × max_padding
         = 1 × CRU
i = 4
    g(3) += coef(8) × max_padding
         = 1 × CRU
```

Among them, i=−4 is 1×g(2) and it can be represented by AL in the cycle of CNT=1 shown in FIG. 6, when i=−3 and i=−2 are collected, it results in 1×g(3)+2×g(4) and can be represented by AU+AL<<1 in the cycle of CNT=1 shown in FIG. 5, when i=−1 and i=0 are collected, it results in 2×g(5)+4×g(6) and can be represented by AU<<1+AL<<2 in the cycle of CNT=2 shown in FIG. 5, when i=1 and i=2 are collected, it results in 2×g(5)+2×g(6) and can be represented by AU<<1+AL<<1 in the cycle of CNT=3 shown in FIG. 5, and when i=3 and i=4 are collected, it results in 1×max_padding+1×mx_padding and can be represented by CRU+CRU in the cycle of CNT=4 shown in FIG. 5. Here, S in FIG. 5 represents the output at the previous cycle from the register 176 and, further, +8 when CNT=0 is a value for rounding, and when there is no rounding, 0 may be input.

In this way, the selectors 161, 162 and 163 and the shifters 164 and 165 are controlled according to the value of the CNT, and the arithmetic as shown in FIG. 5 is carried out in the arithmetic block 106, thereby it is possible to obtain a result which is the same as that obtained by the original arithmetic with less cycles than in a case where 9 cycles arithmetic are performed with changing the value i from −4 to 4 successively for m=6. In addition, it is possible to make the cycle number up to concluding the arithmetic be the same as the cycle number of the arithmetic processing corresponding to the pixel data of m=5 performed by the arithmetic block 105 and, further it is possible to make the cycle at which the arithmetic processing is concluded be the same as that of the arithmetic block 105.

Further, the values of the equation (1) when the value i is changed from −4 to 4 in the arithmetic block 107 corresponding to m=7 becomes as follows.

```
i = −4
    g(3) += coef(0) × g(3)
         = 1 × AU
i = −3
    g(3) += coef(1) × g(4)
         = 1 × AL
i = −2
    g(3) += coef(2) × g(5)
         = 2 × AU
i = −1
    g(3) += coef(3) × g(6)
         = 2 × AL
i = 0
    g(3) += coef(4) × g(7)
         = 4 × AU
i = 1
    g(3) += coef(5) × g(8)
         = 2 × AL
i = 2
    g(3) += coef(6) × max_padding
         = 2 × CRU
i = 3
    g(3) += coef(7) × max_padding
         = 1 × CRU
i = 4
    g(3) += coef(8) × max_padding
         = 1 × CRU
```

Among them, when i=−4 and i=−3 are collected, it results in 1×g(3)+1×g(4) and can be represented by AU+AL in the cycle of CNT=1 shown in FIG. 5, when i=−2 and i=−1 are collected, it results in 2×g(5)+2×g(6) and can be represented by AU<<1+AL<<1 in the cycle of CNT=2 shown in FIG. 5, when i=0 and i=1 are collected, it results in 4×g(7)+2×g(B) and can be represented by AU<<2+AL<<1 in the cycle of CNT=3 shown in FIG. 5, and when i=2 and i=3 are collected, it results in 2×max_padding+1×max_padding and can be represented by CRU<<1+CRU in the cycle of CNT=4 shown in FIG. 5, and i=4 is 1×max_padding and it can be represented by CRU in the cycle of CNT=5 shown in FIG. 5. Here, P in FIG. 5 represents the output of the previous cycle from the register 177 and, further, +8 when CNT=0 is a value for rounding, and when there is no rounding, 0 may be input.

In this way, the selectors 117, 127 and 137 and the shifters 147 and 157 are controlled according to the value of the CNT, and the arithmetic as shown in FIG. 5 is carried out in the arithmetic block 107, thereby it is possible to obtain a result which is the same as that obtained by the original arithmetic with less cycles than in a case where 9 cycles arithmetic are performed by changing the value i from −4 to 4 in order for m=7.

Further, the value of the equation (1) when the value of i is changed from −4 to 4 in the arithmetic block 108 corresponding to m=8 becomes as follows.

```
i = −4
    g(3) += coef(0) × g(4)
         = 1 × AL
i = −3
    g(3) += coef(1) × g(5)
         = 1 × AU
i = −2
    g(3) += coef(2) × g(6)
         = 2 × AL
i = −1
    g(3) += coef(3) × g(7)
         = 2 × AU
i = 0
```

-continued

```
        g ( 3 ) += coef ( 4 ) × g ( 8 )
              = 4 × AL
    i = 1
        g ( 3 ) += coef ( 5 ) × max_padding
              = 2 × CRU
    i = 2
        g ( 3 ) += coef ( 6 ) × max_padding
              = 2 × CRU
    i = 3
        g ( 3 ) += coef ( 7 ) × max_padding
              = 1 × CRU
    i = 4
        g ( 3 ) += coef ( 8 ) × max_padding
              = 1 × CRU
```

Among them, i=−4 is 1×g(4) and it can be represented by AL in the cycle of CNT=1 shown in FIG. 5, when i=−3 and i=−2 are collected, it results in 1g(5)+2×g(6) and can be represented by AU+AL<<1 in the cycle of CNT=2 shown in FIG. 5, when i=−1 and i=0 are collected, it results in 2×g(7)+4× g(8) and can be represented by AU<<1+AL<<2 in the cycle of CNT=3 shown in FIG. 5, when i=1 and i=2 are collected, it results in 2×max_padding+2×max_padding and can be represented by CRU<<1+CRU<<1 in the cycle of CNT=4 shown in FIG. 5, and when i=3 and i=4 are collected, it results in 1×max_padding+1×max_padding and can be represented by CRU+CRU in the cycle of CNT=5 shown in FIG. 5. Here, S in FIG. 5 represents the output at the previous cycle from the register 178 and, further, +8 when CNT=0 is a value for rounding and when there is no rounding, 0 may be input.

In this way, the selectors 118, 128 and 138 and the shifters 148 and 158 are controlled according to the value of the CNT, and the arithmetic as shown in FIG. 5 are carried out in the arithmetic block 108, thereby it is possible to obtain a result which is the same as that obtained by the original arithmetic with less cycles than in a case where 9 cycles arithmetic are performed by changing the value of i from −4 to 4 successively for m=8. In addition, it is possible to make the cycle number up to the concluding the arithmetic be the same as that of the arithmetic processing corresponding to the pixel data of m=7 preformed by the arithmetic block 107 which is and, further, it is possible to make the cycle at which the arithmetic processing is concluded be same as that of the arithmetic block 107.

Further, as shown in FIG. 6, by the output selection circuit 7, the values of n=1 and n=2, which can be obtained respectively from the arithmetic block 101 and 102 when CNT=4, are simultaneously output, the values of n=3 and n=4, which can be obtained respectively from the arithmetic block 103 and 104 when CNT=5, are simultaneously output, the values of n=5 and n=6, which can be obtained respectively from the arithmetic block 105 and 106 when CNT=6, are simultaneously output, and the values of n=7 and n=8, which can be respectively obtained from the arithmetic block 107 and 108 when CNT=7, are simultaneously output. As a result, the arithmetic results of the arithmetic blocks 101~108 are output by a pipeline system for each two arithmetic blocks. Thereby, it is possible to obtain the pixel data having been subjected to the deblocking filtering processing.

As described above, by performing the arithmetic processing as shown in FIG. 2 and FIG. 5 in the arithmetic blocks 101~108, it is possible to obtain an arithmetic result which is the same as the arithmetic result obtained when the same arithmetic for the respective cases of m=1~8 are performed in the prior art, with less cycles than those of the prior art.

Further, according to the embodiment of the present invention, the contents of the processing arithmetic of respective arithmetic blocks 101~108 are controlled by the control circuit 1 in accordance with the cycles of the processing arithmetic, so that the cycles of the processing arithmetic performed in each combination, up to the conclusion of the respective filtering processing among a combination of the first arithmetic block 101 and the second arithmetic block 102, a combination of the third arithmetic block 103 and the fourth arithmetic block 104, a combination of the fifth arithmetic block 105 and the sixth arithmetic block 106, a combination of the seventh arithmetic block 107 and the eighth arithmetic block 108, respectively constituted selected from the first to the eighth arithmetic blocks, should be the same and, further so that the filtering processing of respective combinations should be concluded in an order successively. In addition, as shown in FIG. 6, the output selection circuit 7 is controlled so as to select the output from the arithmetic blocks in a unit of the combination of the arithmetic blocks and to perform a pipeline output. Therefore, the results of the filtering processing are successively output from the respective arithmetic blocks 101~108, thereby resulting in a further reduced cycle number for the filtering processing.

In this way, according to the embodiment of the present invention, it is possible to carry out the arithmetic with changing the value i from −4 to 4 for each pixel m shown in the above-described equation (1) by the respective arithmetic blocks 101~108 by quite a smaller number of cycles than the conventional cycle number. It is also possible to reduce the cycle number to a great extent by performing the arithmetic simultaneously by two arithmetic blocks and output the arithmetic results by two arithmetic blocks by a pipeline output.

In this embodiment of the present invention, it is described a case where two pixel data g(x) and g(x+1) are input per a cycle. However, according to the present invention, if when it is possible to control the contents of the processing arithmetic of respective arithmetic blocks 101~108 in accordance with the cycles of the processing arithmetic, so that the cycles of the processing arithmetic, among a combination of the first arithmetic block 101 and the second arithmetic block 102, a combination of the third arithmetic block 103 and the fourth arithmetic block 104, a combination of the fifth arithmetic block 105 and the sixth arithmetic block 106, a combination of the seventh arithmetic block 107 and the eighth arithmetic block 108 up to the conclusion of the respective filtering processings performed in each combination should be the same and, further that the filtering processing of the respective combinations should be concluded in an order successively, it is possible to increase the width of a bus for transmitting plural pixel data to more than 16 bits and to increase the number of pixel data input per a cycle to 3 or more, for example, to 4. Even in such case, the same effect as that obtained by the embodiment of the present invention can be obtained.

APPLICABILITY IN INDUSTRY

As described above, the deblocking filter arithmetic apparatus and the deblocking filter arithmetic method according to the present invention are useful as a filter processing section and processing method for decoded pixel data in an apparatus for decoding image data which have been subjected to the encoding process to reproduce the same, and the deblocking filter arithmetic apparatus and the deblocking filter arithmetic method are particularly suitable for a case where the image data are those which are encoded by MPEG4 systems.

What is claimed is:

1. A deblocking filter arithmetic apparatus comprising:

first to eighth arithmetic blocks each for receiving, as inputs, simultaneously every two adjacent pixel data among a first to an eighth pixel data, for carrying out in parallel one of cycles of arithmetic processing comprising filter processing of first to eighth pixel data for removing block noises, every time two of the pixel data are input, and each for outputting filtered pixel data in parallel and corresponding to the first to the eighth pixel data and to which two of the pixel data are input simultaneously;

an output selection circuit for selecting one outputs from the first to the eighth arithmetic blocks and for outputting the same; and a control circuit for controlling the arithmetic processing of each arithmetic block, in accordance with the cycles of the arithmetic processing, so that:

the cycles of the arithmetic processing performed on each combination of arithmetic blocks up to the conclusion of the filter processing should be the same, among a combination of a first and second arithmetic block, a combination of a third and fourth arithmetic block, a combination of a fifth and sixth arithmetic block, and a combination of a seventh eighth arithmetic block, respectively, so that the filter processing of each combination of arithmetic blocks is concluded successively among the respective combinations, and said control circuit also for controlling said output selection circuit to select from the arithmetic blocks in for each combination of the arithmetic blocks and to perform a pipeline output.

2. The deblocking filter arithmetic apparatus of claim 1 wherein, the arithmetic block comprises:

a first selection circuit for selecting, according to a cycle of the arithmetic processing, either of two simultaneously inputted pixel data, two values obtained respectively from the first pixel data and the eighth pixel data, and pixel data which define adjacent pixels and correspond to an area outside areas corresponding to the first pixel data and the eighth pixel data respectively, and value 0, a second selection circuit for selecting, according to the cycle of the arithmetic processing, the other of such two simultaneously inputted pixel data, two values obtained respectively from the first pixel data and the eighth pixel data, and pixel data which define adjacent pixels and correspond to an area outside areas corresponding to the first pixel data and the eighth pixel data respectively, and value 0, a third selection circuit for selecting an arithmetic result for the accumulation or value 8, a first shifter for receiving, as input, the output of the first selection circuit, a second shifter for receiving, as input, the output of the second selection circuit, an adder for adding together the output of the first shifter, the output of the second shifter and the output of the third selection circuit, a register for receiving, as input, output of the adder and for outputting the output of the adder as an arithmetic result for accumulation to the third selection circuit, and a third shifter for receiving, as input, output of the register and for outputting the output of the register as an arithmetic result to the output selection circuit.

3. A deblocking filter arithmetic method comprising:

receiving, as inputs, simultaneously every two data among a first to an eighth successive pixel data and carrying out in parallel arithmetic processing comprising filter processing of the first to the eighth pixel data for removing block noises, so that:

the cycles of the arithmetic processing performed on each combination of arithmetic blocks up to the conclusion of the filter processing should be the same, among a combination of a first and second arithmetic block, a combination of a third and fourth arithmetic block, a combination of a fifth and sixth arithmetic block, and a combination of a seventh and eighth arithmetic block, respectively, so that the filtering processing of combinations of the pixel data is concluded successively; and performing a pipeline output of pixel data which are obtained by said receiving and subjected to the filter processing, for the respective combinations of the pixel data in succession.

* * * * *